US009313654B2

(12) United States Patent
Ma et al.

(10) Patent No.: US 9,313,654 B2
(45) Date of Patent: Apr. 12, 2016

(54) WI-FI DIRECT-BASED MESSAGE COMMUNICATION METHODS AND APPARATUS

(71) Applicant: Electronics & Telecommunications Research Institute, Daejeon (KR)

(72) Inventors: Jin Suk Ma, Daejeon (KR); Do Hyeung Kim, Daejeon (KR); Cheol Ryu, Daejeon (KR); Seok Jin Yoon, Daejeon (KR); Min Hong Yun, Daejeon (KR); Choong Bum Park, Daejeon (KR); Jae Ho Lee, Daejeon (KR); Hyung Seok Lee, Daejeon (KR)

(73) Assignee: ELECTRONICS & TELECOMMUNICATIONS RESEARCH INSTITUTE, Daejeon (KR)

( * ) Notice: Subject to any disclaimer, the term of this patent is extended or adjusted under 35 U.S.C. 154(b) by 61 days.

(21) Appl. No.: 14/149,081

(22) Filed: Jan. 7, 2014

(65) Prior Publication Data

US 2014/0241331 A1    Aug. 28, 2014

(30) Foreign Application Priority Data

Feb. 27, 2013    (KR) .................. 10-2013-0021142

(51) Int. Cl.
| | |
|---|---|
| H04W 72/00 | (2009.01) |
| H04W 12/02 | (2009.01) |
| G06Q 30/02 | (2012.01) |
| H04W 4/00 | (2009.01) |
| H04W 84/12 | (2009.01) |

(52) U.S. Cl.
CPC ........... *H04W 12/02* (2013.01); *G06Q 30/0267* (2013.01); *H04W 4/008* (2013.01); *H04W 84/12* (2013.01)

(58) Field of Classification Search
None
See application file for complete search history.

(56) References Cited

U.S. PATENT DOCUMENTS

| | | | | |
|---|---|---|---|---|
| 8,468,054 | B1* | 6/2013 | Espinoza ............... | G06Q 10/00 235/381 |
| 8,744,057 | B2* | 6/2014 | Trauth ............... | G06Q 10/0637 379/202.01 |
| 2007/0254661 | A1* | 11/2007 | Chowdhury et al. ......... | 455/436 |
| 2011/0154084 | A1 | 6/2011 | Vandwalle et al. | |
| 2011/0194489 | A1* | 8/2011 | Itaya et al. ..................... | 370/328 |
| 2013/0227152 | A1* | 8/2013 | Lee et al. ....................... | 709/227 |
| 2013/0308618 | A1* | 11/2013 | Panneerselvam ............. | 370/338 |

FOREIGN PATENT DOCUMENTS

| | | | | |
|---|---|---|---|---|
| KR | 10-2011-0076861 | | 7/2011 | |
| KR | 10-2012-0076639 | | 7/2012 | |
| WO | WO 2012060611 A2 * | 5/2012 | ............ | H04W 48/16 |

OTHER PUBLICATIONS

Wi-Fi Alliance Technical Committee P2P Task Group; "Wi-Fi Peer-to-Peer (P2P) Technical Specification", Wi-Fi Alliance, 2010, pp. 1-159.

* cited by examiner

*Primary Examiner* — Omar Ghowrwal
(74) *Attorney, Agent, or Firm* — Kile Park Reed & Houtteman PLLC

(57) ABSTRACT

Disclosed is a message communication method of transmitting and receiving a certain message, independently of any network, without privacy invasion issues. The method includes generating vendor specific data on the basis of input information, adding the generated vendor specific data to a P2P information element of a probe request frame, and transmitting the probe request frame to another message communication apparatus. Thus, an apparatus conforming to a Wi-Fi Direct standard may transmit/receive a certain message to/from another terminal independently of a use region, a use environment, and a network of a large telecommunication vendor, without privacy invasion issues.

8 Claims, 6 Drawing Sheets

FIG. 3

| ORDER | INFORMATION ELEMENT | NOTE |
|---|---|---|
|  | WSC IE | THE WSC IE SHALL BE PRESENT IN THE FRAMES TRANSMITTED BY A P2P DEVICE. |
| LAST | P2P IE | THE P2P IE SHALL BE PRESENT IN THE FRAMES TRANSMITTED BY A P2P DEVICE. |

FIG. 4

| ATTRIBUTES | REQUIRED/ OPTIONAL | NOTE |
|---|---|---|
| VERSION | R | 0X10=VERSION 1.0, 0X11=VERSION 1.1 ETC |
| REQUEST TYPE | R |  |
| CONFIG METHODS | R |  |
| UUID-(E or R) | R |  |
| PRIMARY DEVICE TYPE | R |  |
| RF BANDS | R | SPECIFIED RF BAND USED FOR THIS MESSAGE |
| ASSOCIATION STATE | R |  |
| CONFIGURATION STATE | R |  |
| DEVICE PASSWORD ID | R |  |
| <OTHER> | O | MULTIPLE ATTRIBUTES ARE PERMITTED |

FIG. 5

| ATTRIBUTES | REQUIRED/ OPTIONAL |
|---|---|
| DEVICE NAME | R |
| REQUIRED DEVICE TYPE | O |

FIG. 6

| ATTRIBUTES | ATTRIBUTE ID | NOTE |
|---|---|---|
| P2P CAPABILITY | 2 | THE P2P CAPABILITY ATTRIBUTE SHALL BE PRESENT IN P2P IE |
| P2P DEVICE ID | 3 | THE P2P DEVICE ID ATTRIBUTE MAY BE PRESENT IN THE PROBE REQUEST FRAME WHEN USING THE DISCOVERY PROTOCOL TO FIND A P2P DEVICE WITH A SPECIFIC DEVICE ADDRESS |
| LISTEN CHANNEL | 6 | THE LISTEN CHANNEL ATTRIBUTE MAY BE PRESENT IN THE P2P IE INDICATION THE OPERATING CLASS AND CHANNEL NUMBER ON WHICH THE P2P DEVICE IS IN THE LISTEN STATE. |
| EXTENDED LISTEN TIMING | 8 | THE EXTENDED LISTEN TIMING ATTRIBUTE MAY BE PRESENT IN THE P2P IE TO ADVERTISE LISTEN STATE AVAILABILITY OF THE P2P DEVICE SENDING THE PROBE REQUEST |
| OPERATING CHANNEL | 17 | THE OPERATING CHANNEL ATTRIBUTE SHALL ONLY BE PRESENT IN THE P2P IE IN THE P2P DEVICE IS AN OPERATING P2P GROUP OWNER AND INDICATES THE OPERATING CLASS AND CHANNEL NUMBER ON WHICH THE P2P DEVICE IS OPERATING AS P2P GROUP OWNER. |

FIG. 7

| ATTRIBUTES | ATTRIBUTE ID | NOTE |
|---|---|---|
| VENDOR SPECIFIC ATTRIBUTE | 221 | THE P2P VENDOR SPECIFIC ATTRIBUTE IN P2P IE |

FIG. 8

| FIELD NAME | SIZE (OCTET) | VALUE | DESCRIPTION |
|---|---|---|---|
| ATTRIBUTE ID | 1 | 221 | IDENTIFYING THE TYPE OF P2P ATTRIBUTE |
| LENGTH | 2 | VARIABLE | LENGTH OF THE FOLLOWING FIELDS IN THE ATTRIBUTE |
| VENDOR SPECIFIC DATA | VARIABLE | STRING DATA | MESSAGE DATA TO TRANSFER |

| ITEM NUMBER | ITEM | MESSAGE CONTENTS (EXAMPLE) |
|---|---|---|
| 1 | MESSAGE | AMERICANO HOT SALE 30% OFF!!! |
| 2 | FIGURE | STARBUCKS LOGO |
| 3 | NAME | STARBUCKS IN CENTRAL,SEOUL |
| 4 | AP NAME | DIRECT-12-STARBUCKS |
| 5 | MAC ADDR | 37:BE:2A:F7:56:12 |
| 6 | GPS POSITION | 123.1234E, 35.1234N |
| 7 | MOBILITY | FIXED |
| 8 | VENUE | COFFEE SHOP |
| 9 | CONNECTION | 802.11n |
| 10 | URL | www.star.com/mini |
| 11 | IS | STARBUCKS.APK |

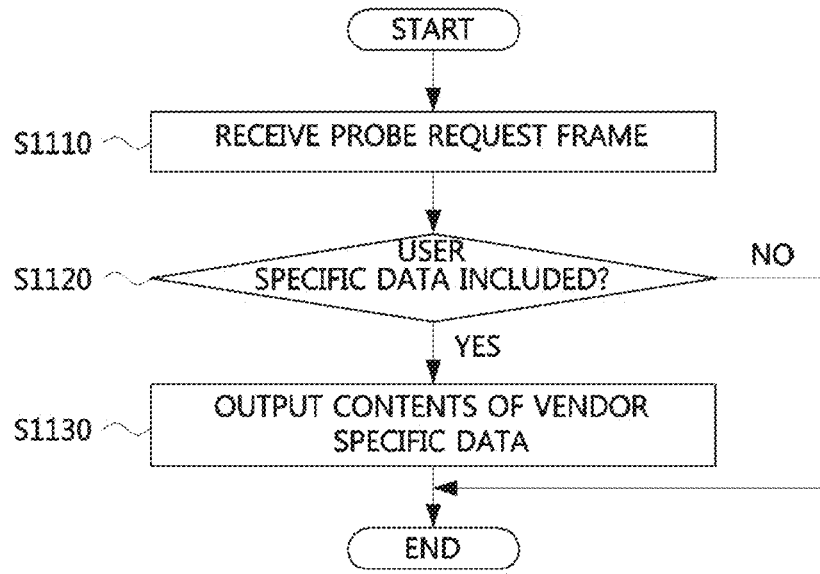
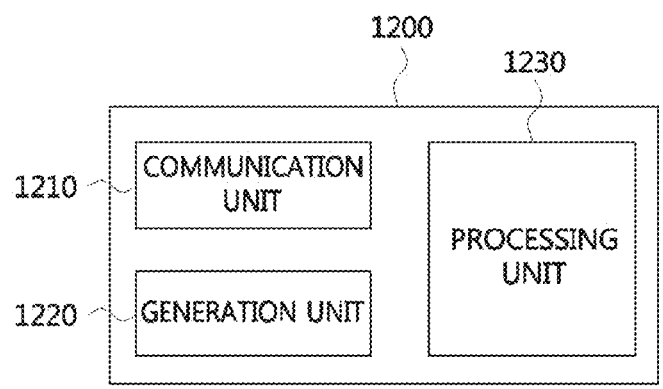
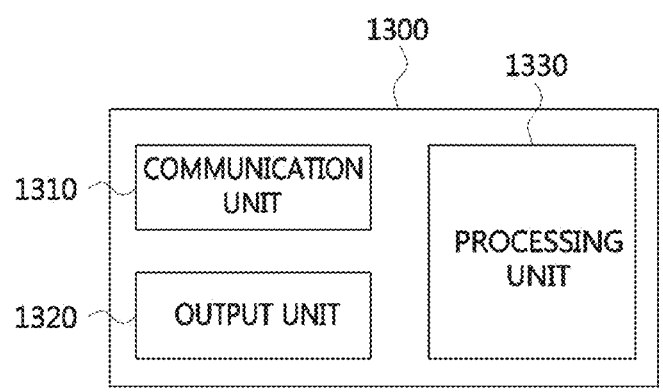

WI-FI DIRECT-BASED MESSAGE COMMUNICATION METHODS AND APPARATUS

CLAIM FOR PRIORITY

This application claims priority to Korean Patent Application No. 10-2013-0021142 filed on Feb. 27, 2013 in the Korean Intellectual Property Office (KIPO), the entire contents of which are hereby incorporated by reference.

BACKGROUND

1. Technical Field

Example embodiments of the present invention relate in general to a wireless communication technology and more specifically to WI-FI Direct-based message communication method and apparatus for transmitting and receiving messages, independently of any network, without privacy invasion issues.

2. Related Art

Recently, the WI-FI Alliance group, which is the international industry standard organization of WI-FI technology, finalized a new WI-FI standard referred to as WI-FI Direct and has performed certification of a variety of WI-FI Direct-based devices.

The WI-FI Direct standard complements a peer-to-peer (P2P) function that is a technical drawback in the existing WI-FI technology and thus allows a P2P connection between machines each having a WI-FI chip installed therein, thereby enabling free machine-to-machine communication without any separate AP.

In the related art, the connection between multiple peers can be implemented with an ad-hoc technology using WI-FI technology. However, if the peers use different types of devices or operating systems, the connection between the peers is actually impossible to implement.

Also, the peers do not have a power management standard supported therebetween to maintain a maximum power consumption function even in a terminal standby time, resulting in significant reduction in a terminal operating time.

To solve these problems, the WI-FI Alliance has established WI-FI Direct technology. Strictly speaking, WI-FI Direct is a name of WI-FI P2P technology established by the WI-FI Alliance. Accordingly, in a technical discussion, the term "WI-FI P2P" is more suitable than the term "WI-FI Direct". However, since the term "WI-FI Direct" has been more widely used, WI-FI P2P technology is collectively referred to as WI-FI Direct throughout this specification.

WI-FI Direct technology is expected to be widely used in a variety of IT equipment such as a printer and a vehicle's navigation terminal as well as a variety of mobile terminal devices such as a smartphone, a digital camera, etc.

Meanwhile, location-based advertising message transmission technology may be largely classified into a push-type service and a pull-type service. If a user has a terminal that uses a mobile communication network such as CDMA and HSPA+ and the terminal has a GPS receiver embedded therein, a service vendor can find out the location of the user. Thus, the service vendor can directly transmit point of interest (POI) information about the user's location to a user terminal using an SMS or MMS service. In this case, SMS or MMS service contents containing advertisement, discount information, etc. may be downloaded to the user terminal. This type of service is referred to as the push-type service. Alternatively, an advertisement message may be popped up in a lower end or certain portion of a screen when the user performs an Internet page, a game, or an application. This type of service is referred to as the pull-type service.

A variety of advertisement messages can be downloaded to the user terminal in the above-classified push-type service and pull-type service. A technical feature in common between the push-type service and pull-type service is that an advertisement service is provided to the user terminal after connecting to a wide area network (such as CDMA or HSPA+) or WI-FI network and experiencing a user authentication step and a device combination step between communicating objects.

A technology of connecting to a wide area network or WI-FI network and receiving an advertisement message is applied using a wireless network infrastructure established by large telecommunication companies. Thus, the user receives a push-type service that has been already approved or an arbitrarily-provided pull-type service without separate change in terminal settings even when there is a handoff between the wide area network and the WI-FI network. That is, the service user unconsciously exposes his/her location information and history information to a telecommunication company or portal, and thus to the advertisement message service.

This may allow the user's personal information to be accumulated to a server of a telecommunication company, thereby causing privacy invasion issues. Also, in this type of advertisement service, the telecommunication company acquires an advertising authority and exercises all rights. This results in building entry barriers to and holding a monopoly on a mobile advertisement market.

If a self-employed person in a small store or a local market wants real-time changing advertisement messages to be freely transmitted only in a certain range from his/her location, the above-described type of service may give a significant burden to the self-employed person who is an advertiser.

This is, there are a monetary barrier where the advertiser should pay a certain amount of advertisement rate and fee and a technical psychological barrier where the advertiser, one of small business owners, is not familiar with a mobile wireless advertisement because only a large telecommunication company exclusively provides a service.

SUMMARY

Accordingly, example embodiments of the present invention are provided to substantially obviate one or more problems due to limitations and disadvantages of the related art.

Example embodiments of the present invention provide a WI-FI Direct-based message communication method for transmitting and receiving a certain message, independently of any network, without privacy invasion issues.

Example embodiments of the present invention also provide a WI-FI Direct-based message communication apparatus for transmitting and receiving a certain message, independently of any network, without privacy invasion issues.

In some example embodiments, a WI-FI Direct-based message communication method according to an embodiment of the present invention includes generating vendor specific data on the basis of input information, adding the generated vendor specific data to a P2P information element of a probe request frame, and transmitting the probe request frame to another message communication apparatus.

A type-length-value structure of the vendor specific data may be defined on the basis of a P2P standard.

The vendor specific data may include at least one of a message, a figure, a name of a message transmission apparatus, an AP name, a MAC address, a GPS position, mobility, a venue, a transmission standard, a uniform resource locator (URL), and invoked software (IS).

In other example embodiments, a WI-FI Direct-based message communication method according to an embodiment of the present invention includes receiving a probe request frame, determining whether vendor specific data is included in the received probe request frame, and outputting contents of the vendor specific data when the vendor specific data is included in the received probe request frame.

The vendor specific data may be added to a P2P information element of the probe request frame.

A type-length-value structure of the vendor specific data may be defined on the basis of a P2P standard.

The vendor specific data may include at least one of a message, a figure, a name of a message transmission apparatus, an AP name, a MAC address, a GPS position, mobility, a venue, a transmission standard, a uniform resource locator (URL), and invoked software (IS).

Here, the outputting of contents of the vendor specific data may include parsing the vendor specific data included in the probe request frame through a protocol to output the contents.

In still other example embodiments, a WI-FI Direct-based message communication apparatus according to an embodiment of the present invention includes a communication unit configured to perform WI-FI Direct communication, a generation unit configured to generate vendor specific data on the basis of input information, and a processing unit configured to add the generated vendor specific data to a P2P information element of a probe request frame and transmit the probe request frame to another message communication apparatus through the communication unit.

A type-length-value structure of the vendor specific data may be defined on the basis of a P2P standard.

The vendor specific data may include at least one of a message, a figure, a name of a message transmission apparatus, an AP name, a MAC address, a GPS position, mobility, a venue, a transmission standard, a uniform resource locator (URL), and invoked software (IS).

In still other example embodiments, a WI-FI Direct-based message communication apparatus according to an embodiment of the present invention includes an output unit, a communication unit configured to perform WI-FI Direct communication, and a processing unit configured to output contents of the vendor specific data through the output unit when the vendor specific data is included in the probe request frame received through the communication unit.

The vendor specific data may be added to a P2P information element of the probe request frame.

A type-length-value structure of the vendor specific data may be defined on the basis of a P2P standard.

The vendor specific data may include at least one of a message, a figure, a name of a message transmission apparatus, an AP name, a MAC address, a GPS position, mobility, a venue, a transmission standard, a uniform resource locator (URL), and invoked software (IS).

Here, the processing unit may parse the vendor specific data included in the probe request frame through a protocol to output the contents through the output unit.

BRIEF DESCRIPTION OF DRAWINGS

Example embodiments of the present invention will become more apparent by describing in detail example embodiments of the present invention with reference to the accompanying drawings, in which:

FIG. 3 illustrates a P2P probe request frame format;

FIG. 4 illustrates a standard of WSC IE;

FIG. 5 illustrates WSC IE items added to the P2P probe request frame;

FIG. 6 illustrates a probe request frame defined in a P2P standard;

FIG. 7 illustrates an attribute of vendor-specific data added to the probe request frame according to an embodiment of the present invention;

FIG. 8 defines a structure of the vendor-specific data according to an embodiment of the present invention;

FIG. 11 is a flowchart illustrating a message reception process performed by a message reception apparatus according to an embodiment of the present invention;

FIG. 12 is a block diagram showing a configuration of a message transmission apparatus according to an embodiment of the present invention;

FIG. 13 is a block diagram showing a configuration of a message reception apparatus according to an embodiment of the present invention;

DESCRIPTION OF EXAMPLE EMBODIMENTS

Figure 1:
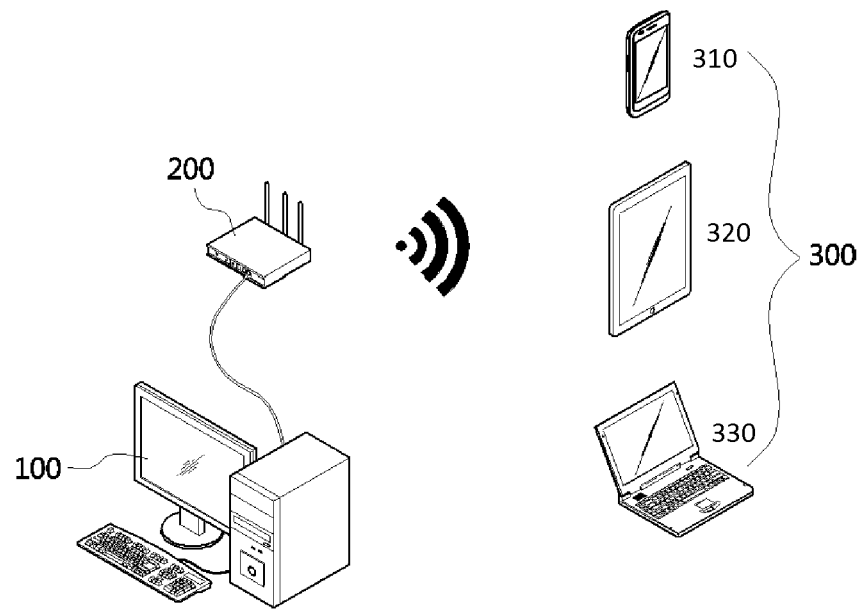
FIG. 1 is a conceptual view illustrating an operating environment where a WI-FI Direct-based message communication method according to an embodiment of the present invention is performed.

Since the present invention may have diverse modified embodiments, preferred embodiments are illustrated in the drawings and are described in the detailed description of the invention.

However, it should be understood that the particular embodiments are not intended to limit the present disclosure to specific forms, but rather the present disclosure is meant to cover all modification, similarities, and alternatives which are included in the spirit and scope of the present disclosure.

Relational terms such as first, second, and the like may be used for describing various elements, but the elements should not be limited by the terms. These terms are used only to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

In the following description, the technical terms are used only for explaining a specific exemplary embodiment while not limiting the present disclosure. The terms of a singular form may include plural forms unless referred to the contrary. The meaning of "comprise," "include," or "have" specifies the presence of stated features, integers, steps, operations, elements, components, and/or groups thereof, but does not preclude the presence or addition of one or more other features, integers, steps, operations, elements, components, and/or groups thereof. Unless terms used in the present disclosure are defined differently, the terms may be construed as meaning known to those skilled in the art. Terms such as terms that are generally used and have been in dictionaries should be construed as having meanings matched with contextual meanings in the art. In this description, unless defined clearly, terms are not ideally or excessively construed as formal meanings.

Embodiments of the present invention will be described below in more detail with reference to the accompanying drawings. In describing the invention, to facilitate the entire understanding of the invention, like numbers refer to like elements throughout the description of the figures, and a repetitive description on the same element is not provided.

Throughout the entire specification, the message transmission apparatus and the message reception apparatus may be referred to as a user equipment (UE), mobile station (MS), user terminal (UT), wireless terminal, access terminal (AT), terminal, subscriber unit, subscriber station (SS), wireless device, wireless communication device, wireless transmit/receive unit (WTRU), mobile node, mobile, etc.

Various embodiments of the message transmission apparatus and the message reception apparatus may include a cellular phone, smartphone with WI-FI Direct function, personal digital assistant (PDA) with WI-FI Direct function, wireless modem, portable computer with WI-FI Direct function, an imaging apparatus such as a digital camera with WI-FI Direct function, gaming apparatus with WI-FI Direct function, home appliance having a function of storing and playing music files with WI-FI Direct function, an Internet home appliance capable of wireless Internet connection and browsing as well as portable units or terminals incorporating combinations of the functions, but are not limited thereto.

Figure 2:
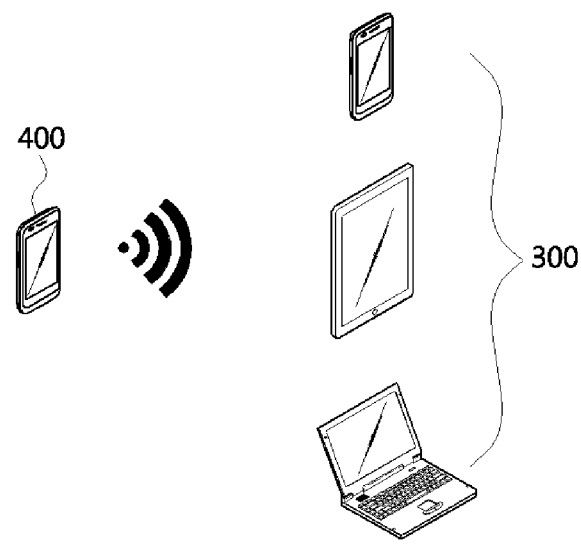
FIG. 2 is a conceptual view illustrating an operating environment where a WI-FI Direct-based message communication method according to another embodiment of the present invention is performed.

FIGS. 1 and 2 are conceptual views each illustrating an operating environment where a WI-FI Direct-based message communication method according to an embodiment of the present invention is performed.

Referring to FIG. 1, the operating environment where the message communication method according to an embodiment of the present invention is performed may include an information processing apparatus 100, a WI-FI direct access point 200, and a message reception apparatus 300.

The information processing apparatus 100 generates a message on the basis of a user's input.

Here, the information processing apparatus 100 may include a terminal having a memory unit and a microprocessor to have an operation capability, such as a desktop computer, notebook computer, palmtop computer, ultra mobile personal computer (UMPC), tablet PC, personal digital assistant (PDA), and web pad.

The WI-FI Direct access point 200 downloads a message generated from the information processing apparatus 100 and transmits the downloaded message to the message reception apparatus 300 around the WI-FI Direct access point 200.

Here, the WI-FI Direct access point 200 is an access point that supports a WI-FI Direct function, which can transmit a WI-FI Direct signal unlike an existing access point.

The message reception apparatus 300 may include a smartphone 310, a smart pad 320, and a notebook 330 which support the WI-FI Direct function, and receives a message from the WI-FI Direct access point 200 and outputs the received message so that a user may check the received message.

Referring to FIG. 2, the operating environment where a message communication method according to an embodiment of the present invention is performed may include a message transmission apparatus 400 and a message reception apparatus 300.

The message transmission apparatus 400 generates a message on the basis of a user's input and transmits the generated message to the message reception apparatus 300 around the message transmission apparatus 400.

Here, the message transmitted by the message transmission apparatus 400 may include an advertisement message, an emergency relief message, sale information message, etc.

The message reception apparatus 300 receives a message from the message transmission apparatus 400 through WI-FI Direct and outputs the received message.

The WI-FI Direct-based message communication method according to an embodiment of the present invention will be described in detail below.

FIG. 3 illustrates a P2P probe request frame format, FIG. 4 illustrates a standard of WSC IE, and FIG. 5 illustrates WSC IE items added to the P2P probe request frame. FIG. 6 illustrates a probe request frame defined in a P2P standard.

First, Referring to FIG. 3, according to the P2P standard, the P2P probe request frame is defined by containing WI-FI simple configuration information elements (WSC IEs) first and adding P2P IEs to the WSC IEs.

Referring to FIG. 4, in the standard of the WSC IEs, a version (Version), a request type (Request Type), configuration methods (Configuration Methods), a universally unique identifier (UUID), a primary device type (Primary Device Type), RF bands (RF Bands), an association state (Association State), a configuration state (Configuration State), a device password ID (Device Password ID), and so on (Other) may be included as attributes.

For a system using WSC authentication, an attribute indicated by "R" (required) indicates that the attribute is essentially required, and an attribute indicated by "O" (optional) indicates that the attribute is optionally added.

Referring to FIG. 5, in the P2P standard, WSC IEs required for the P2P standard are additionally defined, and a device name (Device Name) is defined as an essential item. Also, a required device type (Required Device Type) is defined as a selective item.

The WSC IEs shown in FIG. 5 are added to "Other" item in FIG. 4, and "Device Name" specifies a name of a P2P device.

Also, "Required Device Type" item may be added when one P2P device searches for and requires a response from only a designated specific type of P2P device.

Here, when an ambient device satisfying the P2P standard transmits a probe response frame in response to a probe request frame, the required type of device may be removed.

Referring to FIG. 6, the WSC IE attributes defined in FIGS. 4 and 5 are all added to the P2P probe request frame of FIG. 3, and then as shown in FIG. 3, the P2P IE item is combined to the P2P probe request frame.

The P2P IE items may include P2P capability (P2P Capability), a P2P device ID (P2P Device ID), a listen channel (Listen Channel), an extended listen timing (Extended Listen Timing), and an operating channel (Operating Channel). In actual implementation, "Extended Listen timing" may be deleted.

Here, even when there is a deleted attribute such as "Extended Listen Timing", the message reception apparatus 300 that has received the probe request frame finds out the deleted attribute in a process of parsing the received probe request frame and then continues to parse the next attributes. Thus, this does not make a problem related to deletion of some attributes.

Figures 9, 10:
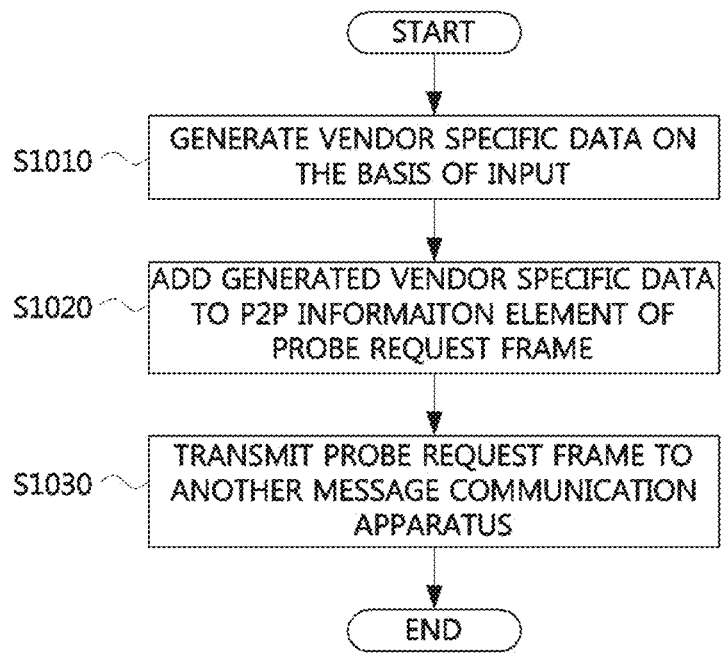
FIG. 9 illustrates an example of use of the P2P vendor-specific data according to an embodiment of the present invention.
FIG. 10 is a flowchart illustrating a message transmission process performed by a message transmission apparatus according to an embodiment of the present invention.

FIG. 7 illustrates an attribute of vendor-specific data added to the probe request frame according to an embodiment of the present invention, and FIG. 8 defines a structure of the vendor-specific data according to an embodiment of the present invention. FIG. 9 illustrates an example of use of the P2P vendor-specific data according to an embodiment of the present invention.

First, Referring to FIG. 7, according to a P2P standard, a user definition type IE attribute is defined in a case of using the P2P IE. That is, in the P2P standard, the user definition type IE is allowed to have an attribute ID of 221, and thus a developing user may add a required attribute.

Referring to FIG. 8, the structure of the vendor specific data may be defined by an attribute ID field (Attribute ID), a length field (Length), and a vendor specific data field (Vendor Specific Data). "Vendor Specific Data" may be configured as shown in FIG. 9.

Referring to FIG. 9, the vendor specific data may include a message (Message), a figure (Figure), a name of a message transmission apparatus (Name), an AP name (AP name), a MAC address (MAC addr), a GPS position (GPS Position), mobility (Mobility), a venue (Venue), a transmission standard (Connection), a uniform resource locator (URL), and invoked software (IS).

Here, a type-length-value structure of the vendor specific data is defined in a method defined in a P2P standard to satisfy the P2P standard. Accordingly, other P2P devices may transmit and receive the probe request frame including the vendor specific data value.

Specifically, in a vendor specific data, a first item is "Message" which indicates message contents to be transmitted. For example, if the message is transmitted from a coffee shop, "Americano Hot Sale 30% Off!!" may be included in the message.

A second item is "Figure" which indicates a picture to be displayed in a screen in addition to a message to be transmitted.

Here, the picture to be displayed in a screen may have a variety of digital image formats that may be formed in jpg, bmp, jpeg, png, or an electronic method.

A third item is "Name" in which the name of the message transmission apparatus 400 is described. For example, a Starbucks coffee shop in Seoul can be seen.

A fourth item is "AP name" which is the formal name of the message transmission apparatus 400, and a fifth item is "MAC addr" which indicates a hardware media access control (MAC) address of the message transmission apparatus 400.

A sixth item is "GPS Position" which indicates GPS coordinates where the message transmission apparatus 400 is located.

Here, if the message transmission apparatus 400 is in a store, its GPS coordinates are unchangeable and thus set once and fixed. If the message transmission apparatus 400 is a mobile device, its GPS coordinates change depending on a position of the mobile device, and thus change in the GPS coordinates is continuously updated using a GPS sensor.

A seventh item is "Mobility", which indicates mobility of the message transmission apparatus 400. That is, when the message transmission apparatus 400 is a mobile device, the message transmission apparatus 400 may be indicated as "Mobile". When the message transmission apparatus 400 is a device fixed in a store or building, the message transmission apparatus may be indicated as "Fixed". For example, if a message is transmitted from a taxi, bus, or personal portable terminal, the message transmission apparatus therein may be denoted as "Mobile".

An eighth item is "Venue", which indicates a feature of a place where the message transmission apparatus 400 transmits a message. For example, if the place where the message transmission apparatus 400 transmits a message is a coffee shop, the term "Coffee shop" is used for this item.

A ninth item indicates a feature of one of 802.11 standards, which is used by the message transmission apparatus 400. This is, 802.11a, 802.11g, 802.11n, or a transmission standard to be used later may be indicated.

A tenth item is "URL" which may be used to post more details. That is, if a touch on "URL" of the tenth item is input in order to check specific information about a received message when the message reception apparatus 300 receives the message from the message transmission apparatus 400, the specific information about the received message may be checked in the URL page.

An eleventh item is "IS" which allows the message received from the message reception apparatus 300 to invoke software inside a terminal.

The message reception apparatus 300 may invoke and use software designated using IS information, thereby additionally performing a variety of services.

FIG. 10 is a flowchart illustrating a message transmission process performed by a message transmission apparatus according to an embodiment of the present invention.

Referring to FIG. 10, the message transmission apparatus 400 generates user data on the basis of a user's input (S1010).

Here, the vendor specific data may be added to a peer-to-peer information element (P2P IE) of the probe request frame. According to the P2P standard, a user definition type IE attribute is defined in a case of using the P2P IE. That is, in the P2P standard, the user definition type IE is allowed to have an attribute ID of 221, and thus a developing user may add a required attribute.

Also, a type-length-value structure of the vendor specific data is defined in a method defined in a P2P standard to satisfy the P2P standard, such that another P2P device may transmit and receive the probe request frame including the vendor specific data.

Also, the structure of vendor specific data may be defined by Attribute ID, Length, and Vendor Specific Data fields. Vendor Specific Data may be configured as shown in FIG. 9.

For example, Vendor Specific Data may include a message (Message), a figure (Figure), a name of the message transmission apparatus 400 (Name), an AP name (AP name), a MAC address (MAC addr), a GPS position (GPS Position), mobility (Mobility), a venue (Venue), a transmission standard (Connection), a uniform resource locator (URL), and invoked software (IS).

Then, the message transmission apparatus 400 adds the vender specific data generated through step S1010 to an P2P IE of the probe request frame (S1020).

Here, a type-length-value (TLV) structure of the vendor specific data is defined on the basis of the P2P standard. Also, the vendor specific data may include a message, a figure, a name of the message transmission apparatus 400, an AP name, a MAC address, a GPS position, mobility, a venue, a transmission standard, a uniform resource locator (URL), and invoked software (IS).

The message transmission apparatus 400 transmits the probe request frame having the vendor specific data added therein to another message communication apparatus (S1030).

Thus, in the WI-FI Direct-based message communication method according to an embodiment of the present invention, a terminal conforming to a WI-FI Direct standard may transmit/receive a certain message to/from another terminal independently of a use region, a use environment, and a network of a large telecommunication vendor, without privacy invasion issues. Also, the method according to an embodiment of the present invention may use a probe request and a probe response signal without an association step and an authentication step required to transmit a message in the existing WI-FI technology, thereby quickly transmitting the message to a number of unspecified persons. Also, the method according to an embodiment of the present invention transmits a message according to the WI-FI Direct standard and thus conforms to an international standard signal transmission system, thereby being allowed to be used as a global common message transmission method.

FIG. 11 is a flowchart illustrating a process of transmitting and receiving a message, which is performed by a message reception apparatus according to an embodiment of the present invention.

Referring to FIG. 11, the message reception apparatus 300 receives the probe request frame from the message transmission apparatus 400 (S1110).

Here, the transmission and reception of the probe request frame between the message reception apparatus 300 and the message transmission apparatus 400 may be performed using WI-FI Direct technology.

The message reception apparatus 300 determines whether vendor specific data is included in the probe request frame received through step S1110 (S1120).

Here, the vendor specific data is added to a P2P IE of the received probe request frame, and a type-length-value (TLV) structure of the vendor specific data is defined on the basis of the P2P standard. Also, the vendor specific data may include a message, a figure, a name of the message transmission apparatus 400, an AP name, a MAC address, a GPS position, mobility, a venue, a transmission standard, a uniform resource locator (URL), invoked software (IS), etc.

Subsequently, the message reception apparatus 300 outputs contents of the vendor specific data when the vendor specific data is included in the probe request frame received through step S1120 (S1130).

Specifically, the message reception apparatus 300 may parse the vendor specific data included in the probe request frame through a protocol and output the contents.

Thus, in the WI-FI Direct-based message communication method according to an embodiment of the present invention, a terminal conforming to a WI-FI Direct standard may transmit/receive a certain message to/from another terminal independently of a use region, a use environment, and a network of a large telecommunication vendor, without privacy invasion issues. Also, the method according to an embodiment of the present invention may use a probe request and a probe response signal without an association step and an authentication step required to transmit a message in the existing WI-FI technology, thereby quickly transmitting the message to a number of unspecified persons. Also, the method according to an embodiment of the present invention transmits a message according to the WI-FI Direct standard and thus conforms to an international standard signal transmission system, thereby being allowed to be used as a global common message transmission method.

A configuration of an apparatus for performing the message communication method according to an embodiment of the present invention will be described below with reference to FIGS. 12 and 13.

Elements to be described below are elements defined by not physical properties but functional properties. Thus, each element may be defined by its function. Each element may be implemented as hardware and/or a program code and a processing unit for performing its function. The functions of two or more elements may be implemented to be included in one element.

Accordingly, it should be noted that names of elements in an embodiment to be described below are not given to physically classify the elements but given to imply representative functions performed by the elements, and the technical spirit of the present invention is not limited by the names of the elements.

FIG. 12 is a block diagram showing a configuration of a message transmission apparatus according to an embodiment of the present invention.

Referring to FIG. 12, the message transmission apparatus 1200 according to an embodiment of the present invention may include a communication unit 1210, a generation unit 1220, and a processing unit 1230.

First, the communication unit 1210 may perform WI-FI Direct communication with another message communication apparatus and transmit a probe request frame to another message communication apparatus under the control of the processing unit 1230.

The generation unit 1220 generates vendor specific data on the basis of user-input information and provides the generated vendor specific data to the processing unit 1230.

The processing unit 1230 adds the vendor specific data provided from the generation unit 1220 to a peer-to-peer information element (P2P IE) of a probe request frame, and transmits the probe request frame having the vendor specific data added thereto to another message communication apparatus through the communication unit 1210.

Here, according to the P2P standard, a vendor specific IE attribute may be defined in a case of using the P2P IE. That is, in the P2P standard, the vendor specific IE is allowed to have an attribute ID of 221, and thus a developing user may add a required attribute.

Also, a type-length-value structure of the vendor specific data is defined in a method defined in the P2P standard to satisfy the P2P standard, such that another P2P device may transmit and receive the probe request frame including the vendor specific data.

Also, the structure of vendor specific data may be defined by Attribute ID, Length, and Vendor Specific Data fields. Vendor Specific Data may be configured as shown in FIG. 9.

For example, Vendor Specific Data may include a message (Message), a figure (Figure), a name of the message transmission apparatus 400 (Name), an AP name (AP name), a MAC address (MAC addr), a GPS position (GPS Position), mobility (Mobility), a venue (Venue), a transmission standard (Connection), a uniform resource locator (URL), and invoked software (IS).

Thus, in the WI-FI Direct-based message transmission apparatus 400 according to an embodiment of the present invention, a terminal conforming to a WI-FI Direct standard may transmit/receive a certain message to/from another terminal independently of a use region, a use environment, and a network of a large telecommunication vendor, without privacy invasion issues.

FIG. 13 is a block diagram showing a configuration of a message reception apparatus according to an embodiment of the present invention.

Referring to FIG. 13, the message reception apparatus 1300 according to an embodiment of the present invention may include a communication unit 1310, an output unit 1320, and a processing unit 1330.

First, the communication unit 1310 may perform WI-FI Direct communication with another message communication apparatus and receive the probe request frame from another message communication apparatus.

The output unit 1320 outputs the specific contents under the control of the processing unit 1330.

When vendor specific data is included in a probe request frame received through the communication unit 1310, the processing unit 1330 outputs the contents of the vendor specific data through the output unit 1320.

Here, the vendor specific data may be added to a peer-to-peer information element (P2P IE) of the probe request frame.

Also, a type-length-value (TLV) structure of the vendor specific data may be defined on the basis of the P2P standard.

Also, the processing unit 1330 may parse the vendor specific data included in the probe request frame through a protocol and output the parsed vendor specific data through the output unit 1320.

Thus, in the WI-FI Direct-based message reception apparatus 1300 according to an embodiment of the present invention, a terminal conforming to a WI-FI Direct standard may transmit/receive a certain message to/from another terminal independently of a use region, a use environment, and a network of a large telecommunication vendor, without privacy invasion issues.

Figure 14:
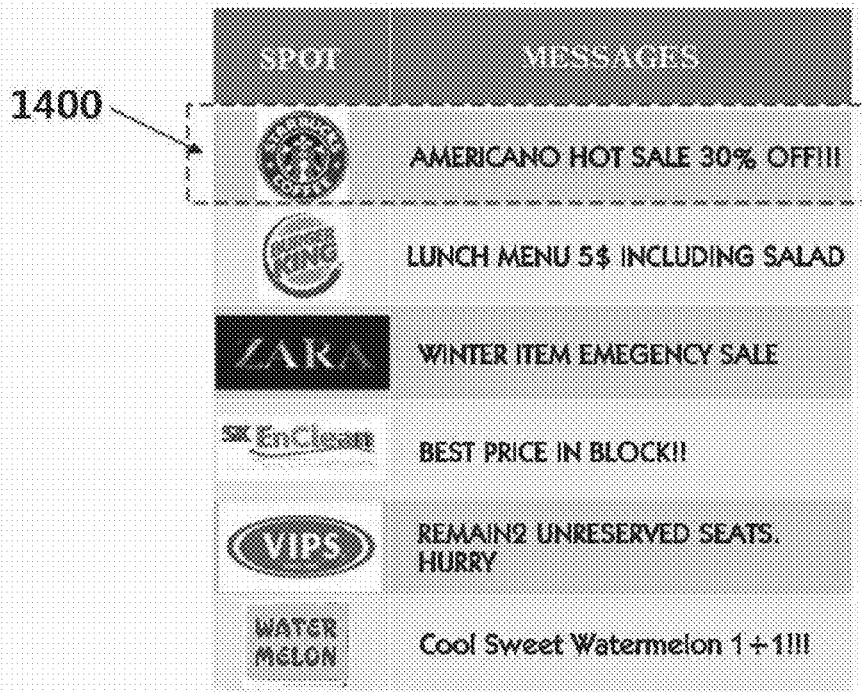
FIG. 14 shows a screen for displaying a message received by the message reception apparatus according to an embodiment of the present invention.
Figure 15:
FIG. 15 shows a screen of the message reception apparatus that connects to a related mobile page using the message received according to an embodiment of the present invention.

FIG. 14 shows a display screen of a terminal that receives an advertisement message according to an embodiment of the present invention, and FIG. 15 shows a screen connected to a related mobile page through the received advertisement message according to an embodiment of the present invention.

Referring to FIGS. 14 and 15, the message reception apparatus 300 receives a P2P message from the message transmission apparatus 400, and then outputs the received P2P message to allow a user to check the P2P message.

If the message reception apparatus receives a selection of a first advertisement message 1400 from a user, the message reception apparatus 300 may move to a URL page defined in the above-described vendor specific data to check specific information about the first advertisement message as shown in FIG. 13.

Here, the specific information about the advertisement message shown in FIG. 15 is only an example, but is not limited thereto in another embodiment of the present invention and may be formed as another configuration. Also, it is obvious that an existing variety of web page configuring technologies may be used after connection to a URL page.

In the message communication method according to an embodiment of the present invention, the message transmission apparatus adds a message generated based on a user's input within a range where WI-FI Direct is supported, to a P2P information element of a probe request frame and then transmits the probe request frame having the messaged added thereto to another P2P terminal, and the message reception apparatus having a WI-FI Direct wireless chip receives the probe request frame.

Accordingly, information on sales point products being sold in an urban store may be transmitted to potential customers around the store, and also product information that is changed whenever the product is sold in a department store or wholesale mart may be transmitted to customers in the department store or wholesale mart, thereby facilitating their purchases.

Also, when the message transmission apparatus according to an embodiment of the present invention is installed in public transportation such as a taxi and a bus, in comparison with existing banner sticker type advertisement and leaflet advertisement, a printing cost may be saved, an urban view may not be spoiled, and a message may be transmitted to a number of unspecified persons who each have a smartphone. Thus, better advertisement effect can be expected.

Also, in the WI-FI Direct standard established by the WI-FI Alliance, a physical transmission range of a chip is limited within tens to hundreds of meters. Thus, since a signal is transmitted to a terminal around a message transmission region in WI-FI Direct, complicated cell management such as in a cellular network is not needed, and message transmission is physically limited to a user who needs an advertisement message, thereby naturally solving congestion of advertisement messages.

Also, the WI-FI Direct technology of the present invention uses a probe request and a probe response without an association step and an authentication step required to transmit a message in the existing WI-FI technology, thereby transmitting the message to a number of unspecified persons very quickly.

Also, the method according to an embodiment of the present invention transmits a message according to a WI-FI Direct standard and thus conforms to an international standard signal transmission system, thereby being allowed to be used as a global common message transmission method. That is, any apparatus applying the present invention can transmit and receive a message in the same method in all the countries around the world according to the method of the present invention.

Also, the apparatus applying the present invention uses WI-FI Direct communication, thereby significantly reducing traffic loads of a wide area network.

While the example embodiments of the present invention and their advantages have been described in detail, it should be understood that various changes, substitutions, and alterations may be made herein without departing from the scope of the invention.

What is claimed is:

1. A WI-FI Direct-based message transmission method performed by a message communication apparatus, the message transmission method comprising:

generating vendor specific data related to advertisement information on a basis of vendor information input by a user;

adding the generated vendor specific data to a peer-to-peer information element of a probe request frame; and transmitting the probe request frame to another message communication apparatus, wherein the vendor specific data comprises at least one of a message, a figure, a name of the message communication apparatus, an AP name, a MAC address, a GPS position, mobility, a venue, a transmission standard, a uniform resource locator, and invoked software.

2. The WI-FI Direct-based message transmission method of claim 1, wherein a type-length-value structure of the vendor specific data is defined on a basis of a peer-to-peer standard.

3. A WI-FI Direct-based message reception method performed by a message communication apparatus, the message reception method comprising:
   receiving a probe request frame;
   determining whether vendor specific data related to advertisement information, generated on a basis of vendor information input by a user, is included in a peer-to-peer information element of the received probe request frame; and
   outputting contents of the vendor specific data when the vendor specific data is included in the received probe request frame,
   wherein the vendor specific data comprises at least one of a message, a figure, a name of the message communication apparatus, an AP name, a MAC address, a GPS position, mobility, a venue, a transmission standard, a uniform resource locator, and invoked software, and
   wherein the vendor specific data is added to a peer-to-peer information element of the probe request frame.

4. The WI-FI Direct-based message reception method of claim 3, wherein a type-length-value structure of the vendor specific data is defined on a basis of a peer-to-peer standard.

5. The WI-FI Direct-based message reception method of claim 3, wherein the outputting of contents of the vendor specific data comprises parsing the vendor specific data included in the probe request frame through a protocol to output the contents.

6. A WI-FI Direct-based message communication apparatus comprising:
   a communication unit that performs WI-FI Direct communication to receive a probe request frame and transmits the probe request frame to a processing unit;
   the processing unit that receives the probe request frame from the communication unit to transmit contents of vendor specific data related to advertisement information, generated on a basis of vendor information input by a user, to an output unit when the vendor specific data is included in a peer-to-peer information element of the probe request frame received through the communication unit; and
   the output unit that receives the vendor specific data from the processing unit to output the contents of the vendor specific data,
   wherein the vendor specific data comprises at least one of a message, a figure, a name of the WI-FI Direct-based message communication apparatus, an AP name, a MAC address, a GPS position, mobility, a venue, a transmission standard, a uniform resource locator, and invoked software, and
   wherein the vendor specific data is added to a peer-to-peer information element of the probe request frame.

7. The WI-FI Direct-based message communication apparatus of claim 6, wherein a type-length-value structure of the vendor specific data is defined on a basis of a peer-to-peer standard.

8. The WI-FI Direct-based message communication apparatus of claim 6, wherein the processing unit parses the vendor specific data included in the probe request frame through a protocol to output the contents through the output unit.

* * * * *